United States Patent [19]
Shibata et al.

[11] Patent Number: 5,851,394
[45] Date of Patent: Dec. 22, 1998

[54] MODULE FOR BLOOD PURIFICATION, BLOOD PURIFICATION MEMBRANE AND ITS PRODUCTION

[75] Inventors: Kazuhisa Shibata; Motoki Kyo; Hidehiko Sakurai; Makoto Ohno, all of Otsu, Japan

[73] Assignee: Toyo Boseki Kabushiki Kaisha, Osaka, Japan

[21] Appl. No.: 573,785

[22] Filed: Dec. 18, 1995

[30] Foreign Application Priority Data

| Dec. 16, 1994 | [JP] | Japan | 6-313533 |
| Oct. 5, 1995 | [JP] | Japan | 7-258517 |

[51] Int. Cl.$^6$ .......................... B01D 69/02; B01D 63/00; B01D 69/00; B01D 69/08
[52] U.S. Cl. .............. 210/500.23; 210/484; 210/500.21; 210/500.29; 210/500.41; 264/41; 264/184; 264/187; 264/209.1
[58] Field of Search .................. 210/500.21, 500.23, 210/500.29, 500.41, 500.27, 483, 484; 264/41, 184, 187, 203, 209.1

[56] References Cited

U.S. PATENT DOCUMENTS

| 4,323,627 | 4/1982 | Joh | 264/209.1 |
| 4,402,940 | 9/1983 | Nose et al. | 424/101 |
| 4,610,791 | 9/1986 | Henne et al. | 210/500.23 |
| 4,874,522 | 10/1989 | Okamoto et al. | 210/645 |
| 4,906,375 | 3/1990 | Heilmann | 210/500.23 |
| 4,935,141 | 6/1990 | Buck et al. | 210/500.38 |
| 5,340,480 | 8/1994 | Kawata et al. | 210/500.23 |
| 5,387,345 | 2/1995 | Dünweg et al. | 210/500.23 |

FOREIGN PATENT DOCUMENTS

| 0 351 773 | 1/1990 | European Pat. Off. |
| 0 570 826 | 11/1993 | European Pat. Off. |
| 61-164602 | 7/1986 | Japan . |
| 1-94902 | 4/1989 | Japan . |
| 5-54373 | 8/1993 | Japan . |
| 5-69571 | 10/1993 | Japan . |

*Primary Examiner*—John Kim
*Attorney, Agent, or Firm*—Foley & Lardner

[57] ABSTRACT

A blood purification membrane having a membrane thickness of 10 to 35 μm, an inner diameter of 100 to 300 μm, a porosity of 50 to 85%, a water permeability (ultrafiltration rate) at 37° C. of not less than 20 ml/m$^2$·Hr·mmHg and a sieving coefficient of albumin of not more than 0.01, a substantially homogeneous interior structure, and a smooth surface structure. A process for producing the membrane and a module are also provided.

11 Claims, 6 Drawing Sheets

MODULE FOR BLOOD PURIFICATION, BLOOD PURIFICATION MEMBRANE AND ITS PRODUCTION

FIELD OF THE INVENTION

The present invention relates to a blood purification membrane used for hemodialysis, etc., a process for producing the blood purification membrane, and a module for blood purification using the blood purification membrane.

Specifically, the present invention relates to a blood purification membrane suitable for the treatment of a large amount of water removal, which can maintain stable removal of a large amount of water in hemodiafiltration and hemofiltration as well as conventional hemodialysis for the treatment of chronic renal failure and can efficiently remove uremic toxins such as β2-microglobulin by dialysis or filtration as well as the treatment of a large amount of water removal, a process for producing the blood purification membrane, and a module for blood purification using the blood purification membrane.

BACKGROUND OF THE INVENTION

Hemodialysis has mainly been carried out as maintenance therapy for patients with chronic renal failure. However, because hemodialysis removes uremic toxins only by diffusion, it insufficiently removes low molecular weight proteins having a molecular weight of not less than 10,000 although it sufficiently removes low molecular weight substances such as urea. Dialysis complications such as dialysis related amyloidosis, pain, etc., are therefore inevitable, and increases patients' pain. In view of the above, in order to actively remove low molecular weight proteins having a molecular weight of not less than 10,000 that is considered to cause the above complications, attention has been paid to blood purification carried out at an increased filtration flow rate, such as hemofiltration (hereinafter referred to as HF) or hemodiafiltration (hereinafter referred to as HDF).

High ultrafiltration rates are required to obtain high filtration flow rate (hereinafter referred to as Qf). Factors affecting such ultrafiltration rates include protein concentrations and hematocrit values in the blood, as well as blood flow rate which are controllable. Because increasing blood flow rate can increase Qf, blood flow rate is often increased to 250 to 400 ml/min from the normal level (200 ml/min) in HF and HDF. However, old or poorly-built patients generally have small blood vessels, and their possible blood flow rate is at most 200 ml/min, normally about 150 ml/min. When these patients undergo HF or HDF, it is necessary to prolong the treatment time or give up necessary filtration. Therefore, the patients have to spend long hours on such therapy, and such therapy sometimes provides insufficient therapeutic effects.

In addition, the filtration of blood containing hemocyte and proteins sometimes cause membrane plugging, protein adsorption or its gel layer formation on the membrane surface. The protein adsorption or its gel layer formation induces a polarized protein layer, the so-called secondary layer, on the blood side of the membrane. Thus, increased filtration flux in hemofiltration causes membrane plugging, which decreases the solute-removing ability of the membrane, and high Qf is impossible if the secondary layer is formed.

In order to prevent deterioration of membrane performances caused by the membrane plugging, it is considered to be effective to (i) choose membrane materials that slightly adsorbs proteins, (ii) increase a shear rate of the blood flow, (iii) make pores large, etc. In order to inhibit the formation of the polarized protein layer on the blood side of the membrane, it is considered to be effective (i) to smooth the inner surface of the membrane, (ii) not to increase transmembrane pressure (TMP), etc.

Various solutions for the above problems have been proposed. For example, JP-A 1-94902 discloses a polysulfone asymmetric hollow-fiber membrane that has excellent dialysis performances and causes a small time-course decrease in the filtration rate during the use for many hours. However, because the membrane removes β2-microglobulin (hereinafter referred to as β2-MG) by adsorbing β2-MG to the membrane (claim 2 on page 1, and lines 3–11 of the lower left column on page 5), there is a limit of the amount of β2-MG that the membrane can remove (i.e., adsorption saturation limit). Even if β2-MG is removable, it is uncertain whether the membrane can remove harmful substances (e.g., uremic toxins) having several thousands to scores of thousands of molecular weights other than β2-MG. Thus, the membrane does not necessarily remove such uremic toxins sufficiently.

JP-B 5-69571 discloses a polysulfone asymmetric hollow fiber membrane having excellent resistance to heat and chemicals and having a skin layer as an outer surface. However, the membrane having a skin layer as an outer surface is originally used to remove CRUD in nuclear power generation (page 2, left column, lines 8–15). Because it is necessary to flow blood outside of the hollow-fiber membrane when the membrane is used for hemodialysis, etc., the blood comes into contact with part of the module other than the hollow fiber membrane, the blood to be treated is damaged, homogeneous blood flow cannot be maintained, and the dialysis efficiency decreases. Thus, the membrane is considered unsuitable for hemodialysis/filtration, etc.

JP-B 5-54373 discloses an asymmetric hollow-fiber membrane for the treatment of blood having excellent solute-permeability. The membrane has excellent dialysis removability and clearance even at a high Qf. However, the results in the publication show that the clearance even of low molecular weight substances such as urea is decreased at the end of the dialysis from the clearance at the beginning of the dialysis (Table 1 on page 10, Center B). It is considered impossible to stably remove harmful low molecular weight proteins such as β2-MG.

As described above, the prior art methods have not yet provided blood purification membranes that can remove uremigenic substances such as β2-MG while maintaining stable Qf during the therapy of removing a large amount of water such as HDF. The therapeutic effects of HF or HDF have been unsatisfactory.

OBJECTS OF THE INVENTION

The main object of the present invention is to provide a blood purification membrane that can produce high Qf and has stable and excellent solute-removing performances even at high Qf without increasing blood flow rate, and can efficiently remove harmful low molecular weight proteins such as β2-MG in the therapy of removing a large amount of water such as HDF or HF, a process for producing the blood purification membrane, and a module for blood purification using the blood purification membrane.

This object as well as other objects and advantages of the present invention will become apparent to those skilled in the art from the following description with reference to the accompanying drawings.

SUMMARY OF THE INVENTION

The present inventors have intensively studied on the relationship between the membrane structure of membranes and membrane plugging or the so-called secondary layer formation in the treatment of blood to achieve the above objects. As a result, it has been found that a membrane having a substantially homogeneous interior structure with a thickness within a certain range and improved smoothness of the membrane surface can inhibit membrane plugging and polarized protein layer formation on the blood side of the membrane, and thereby improve the stability of ultrafiltration rate and separability and maintain high ultrafiltration rate and separability.

That is, the present inventors have obtained the following findings and assumptions.

1. When the interior of the membrane has a heterogeneous structure, the separation with the membrane occurs only in the active layer of the membrane surface. Therefore, when local defects or fluctuations at the separation are occurred on the membrane surface, the membrane is readily plugged around that parts. In particular, in the case of the filtration of blood, containing a large amount of hemocytes and proteins, the plugging or fouling has very significant effects. On the contrary, when the entire membrane has a homogeneous structure, the filtration is supported by the entire membrane. Therefore, even when a part of the membrane surface has the above defects, the entire membrane can make up for the defects and the progress of the above fouling can be inhibited.

2. A thin membrane having a thickness within a certain range can reduce resistance to solute-permeation in hemofiltration, and maintain high ultrafiltration rate.

3. It is generally known that, when blood is flowed through a membrane, protein adsorption layers are always formed on the membrane surface in contact with the proteins and a secondary layer is formed on the adsorption layer. The formation of the secondary layer can be inhibited by decreasing the membrane thickness to reduce resistance to permeation, and by making the membrane surface smooth to obtain smooth adsorptive layers (in this case a degree of smoothness of adsorptive layers means the smooth flow order, not protein size order). The inhibition of the secondary layer formation can maintain high ultrafiltration rate.

Thus, in order to ensure stable filtration properties in blood purification, particularly in blood purification at high Qf for removing a large amount of water, the following factors are important: i) the membrane structure is homogeneous, ii) the membrane is a thin membrane having a thickness within a certain range, and iii) the membrane has a smooth surface.

In addition, the membrane having a homogeneous structure has the following advantages. When the membrane has a heterogeneous structure, for example, when membrane is composed of hydrophobic and hydrophilic polymers, the hydrophilic polymer in the membrane effuses through large pores of the membrane. This sometimes causes problems such as changes in membrane performances and a large amount of effusions from the membrane. However, when the membrane has a homogeneous structure, the hydrophilic polymer in the membrane is confined in the membrane structure and thus tightly fixed, and the above problems are not caused. In addition, when the heterogeneous membrane has large pores on the outer surface of the membrane, there is a fear of problems such as the contamination of foreign substances such as endotoxin from the dialyzate side. However, there is no such fear in the case of homogeneous membranes.

It is difficult to accurately and objectively quantify the homogeneity of the interior structure of the membrane and the smoothness on the membrane surface by current technology. In the present invention, the substantially homogeneous interior structure of the membrane means that observation of the cross section of the membrane with a microscope reveals a homogeneous structure with no clearly recognizable structure such as finger-like or stitch structure (i.e., with no pores). The smooth surface structure of the membrane means that observation of the membrane surface with a 5000-power scanning electron microscope reveals no clearly recognizable pores or unevenness. The magnification of 5000 is used because, when the magnification exceeds 5000, membrane-constituting polymers show tendency to melting with heat evolved from the electron beam.

In addition, the present inventors have obtained the following findings and assumptions in the process of the study on the smoothness on the membrane surface.

4. The membrane with a smooth surface and more homogeneous size of pores on the membrane surface has a more small maximum pore diameter when compared with membranes with the same mean pore diameters. Therefore, as described above, the membrane with a smooth surface and homogeneous size of pores on the membrane surface can reduce the thickness of the so-called secondary layer which is formed when blood is flowed through the membrane, and thereby can maintain filtration properties for low molecular weight proteins such as β2-MG and inhibit the reduction in the filtration properties even at high Qf.

5. When the membrane has a very good smoothness on the membrane surface and/or low heterogeneity in pore shape, the membrane can reduce the additional accumulation of proteins on the formed secondary layer, and inhibit the reduction of the water-permeability in hemofiltration.

6. The maximum filtration flow rate (Qf) in hemofiltration can be controlled by controlling the pore size within the range in which the smoothness of the membrane surface is maintained.

However, as described above, it is very difficult to quantify the membrane structure by current technology. In the present invention, the membrane structure is therefore characterized by its characteristic values. That is, in the present invention, β2-microglobulin retention is used for the above item 4, ultrafiltration rate retention is used for the above item 5, and Qf is used for the above item 6.

In addition, the present inventors have found that, when the above membrane is a hollow-fiber membrane, a hollow-fiber membrane having highly smooth inner surface can be obtained by the air-gap spinning method using a gas as a bore-forming agent at a higher gas temperature than the coagulable liquid temperature.

The reason for this is unclear, but it can be considered as follows. In the air-gap spinning supplying an increased temperature gas into the center of the hollow-fiber membrane promotes the coagulation because some of the solvent vaporize in the spinning dope present near the surface in the hollow-fiber membrane. In addition, the difference in temperature between the coagulable liquid and the gas, causes rapid coagulation, the pores in the membrane becomes so small and homogeneous in size within the range described above, and less heterogeneity in pore shape is obtained.

In addition, it can be considered that the spinning with essentially no stretching provides less heterogeneity in pore shape, and addition of glycerin as a nonsolvent to the spinning dope gives more homogeneous distribution of the dissolved polymer and more homogeneous pore size of the membrane.

After further studies based on these findings, the present invention has been accomplished.

The present invention provides a blood purification membrane having a membrane thickness of 10 to 35 μm, an inner diameter of 100 to 300 μm, a porosity of 50 to 85%, a water permeability at 37° C. of not less than 20 ml/m²·Hr·mmHg and a sieving coefficient of albumin of not more than 0.01, a substantially homogeneous interior structure, and a smooth surface structure.

When hemofiltration is carried out by flowing bovine blood having a hematocrit value of 30% and a protein concentration of 7 g/dl through a module packed with the membrane of the invention at a flow rate of 200 ml/min, the retention of a sieving coefficient of β2-microglobulin in the hemofiltration at a filtration flow rate of 50 ml/min to a sieving coefficient of β2-microglobulin in hemofiltration at a filtration flow rate of 10 ml/min is preferably not less than 60%.

When hemofiltration is carried out at a filtration rate of 50 ml/min by flowing bovine blood having a hematocrit value of 30% and a protein concentration of 7 g/dl through a module packed with the membrane of the invention at a flow rate of 200 ml/min, the retention of an ultrafiltration rate 5 hours after the beginning of the hemofiltration to an ultrafiltration rate 15 minutes after the beginning of the hemofiltration is preferably not less than 80%.

When hemofiltration is carried out at a transmembrane pressure (i.e., the differential between the pressures on both sides of the membrane) of 300 mmHg by flowing bovine blood having a hematocrit value of 30% and a protein concentration of 7 g/dl through a module packed with the membrane of the invention at a flow rate of 200 ml/min, the filtration flow rate (Qf) per module is preferably not less than 70 ml/min.

The main materials of the hemocatharsis membrane of the invention are preferably composed of one or more polymers selected from polysulfone polymers and cellulose polymers, and those derivatives.

The hemocatharsis membrane of the invention is preferably a hollow-fiber membrane.

The present invention also provides a membrane having a membrane thickness of 10 to 35 μm, an inner diameter of 100 to 300 μm, a porosity of 50 to 85%, a water permeability (ultrafiltration rate) at 37° C. of not less than 20 ml/m²·Hr·mmHg, a sieving coefficient of albumin of not more than 0.01, and a sieving coefficient retention of not less than 60%, said sieving coefficient retention being a ratio of a sieving coefficient of β2-microglobulin in hemofiltration at a filtration flow rate of 50 ml/min to a sieving coefficient of β2-microglobulin in hemofiltration at a filtration flow rate of 10 ml/min when the hemofiltration is carried out by flowing bovine blood having a hematocrit value of 30% and a protein concentration of 7 g/dl through a module packed with the membrane at a flow rate of 200 ml/min.

The present invention also provides a membrane having a membrane thickness of 10 to 35 μm, an inner diameter of 100 to 300 μm, a porosity of 50 to 85%, a water permeability (ultrafiltration rate) at 37° C. of not less than 20 ml/m²·Hr·mmHg, a sieving coefficient of albumin of not more than 0.01, and an ultrafiltration rate retention of not less than 80%, said ultrafiltration rate retention being a ratio of a water ultrafiltration rate in hemofiltration at a filtration flow rate of 50 ml/min to a water ultrafiltration rate in hemofiltration at a filtration flow rate of 10 ml/min when the hemofiltration is carried out by flowing bovine blood having a hematocrit value of 30% and a protein concentration of 7 g/dl through a module packed with the membrane at a flow rate of 200 ml/min.

The present invention also provides a membrane having a membrane thickness of 10 to 35 μm, an inner diameter of 100 to 300 μm, a porosity of 50 to 85%, a water permeability (UFR) at 37° C. of not less than 20 ml/m²·Hr·mmHg, a sieving coefficient of albumin of not more than 0.01, and a filtration flow rate per module of not less than 70 ml/min when hemofiltration is carried out at a transmembrane pressure of 300 mmHg by flowing bovine blood having a hematocrit value of 30% and a protein concentration of 7 g/dl through a module packed with the membrane at a flow rate of 200 ml/min.

The present invention also provides a process for producing a hollow-fiber membrane by air-gap spinning method, which comprises extruding a spinning dope from a tube-in-orifice spinneret, introducing a gas as a bore-forming agent into the center of the spinneret, passing the extruded spinning dope through the air, and coagulating the dope through a coagulable liquid, the temperature of said gas being at least 20° C. higher than the temperature of the coagulable liquid.

In the process of the invention, the spinning is preferably carried out with substantially no stretching.

In the process of the invention, glycerin is preferably added to the spinning dope as a nonsolvent.

The present invention also provides a module packed with any one of the membranes described above in a packing ratio of 40 to 80% and an effective membrane area of 0.9 to 2.5 m².

DETAILED DESCRIPTION OF THE INVENTION

The thickness of the membrane of the invention is 10 to 35 μm. When the membrane thickness is less than 10 μm, the strength of the membrane decreases, and it is difficult to keep the thickness constant, and the productivity significantly decreases. When the membrane thickness exceeds 35 μm, it is impossible to maintain homogeneous conditions for the phase separation in the membrane formation, and therefore a smooth inner surface cannot be obtained. The resulting non-smooth inner surface promotes the formation of the protein polar layers in hemofiltration, and increases filtration resistance. Particularly in the therapy in which a large amount of water is removed, the time-course decrease in the ultrafiltration rate increases, and it becomes difficult to maintain high performance for dialysis or filtration.

The membrane thickness is preferably 15 to 35 μm.

The porosity of the membrane of the invention is 50% to 85%. When the porosity is less than 50%, sufficient performance for removing solutes are not obtained and the resulting membrane is unsuitable for blood purification. When the porosity exceeds 85%, the strength of the membrane decreases and thereby the productivity falls.

The porosity is calculated as follows. After the membrane is washed with water for 1 to 2 hours, water on the membrane surface (in the case of hollow-fiber type membranes, water on the outer surface and water remaining in the bore) is removed, and the membrane is weighed (Weight A). After the membrane is completely dried at 105° C., the membrane is weighed (Weight B). The porosity can be calculated from the following equation.

Porosity (%) =

(Weight $A$ − Weight $B$)/{(Weight $A$ − Weight $B$) + (Weight $B/\rho$)} × 100 where $\rho$ is specific gravity of the polymer.

The inner diameter of the hollow-fiber membrane of the invention is 100 μm to 300 μm. The membrane having an inner diameter of less than 100 μm increases pressure drop on flowing of blood, damages the blood components, and sometimes causes hemolysis. In addition, there is a fear of the blood coagulation, which sometimes forms thrombus in the bore. When the inner diameter exceeds 300 μm, the bore is too large to maintain the hollow shape, and the productivity decreases. In addition, a decrease in the shear rate in the inner surface of the hollow-fiber membrane promotes the accumulation of proteins, etc., on the inner surface of the membrane as the filtration proceeds.

The inner diameter is preferably 120 to 250 μm.

The water permeability (UFR) at 37° C. of the membrane of the invention is not less than 20 ml/m²·mmHg·hr. When the pure water permeability (UFR) is less than 20 ml/m²·mmHg·hr, the water permeability (UFR) is insufficient to remove a large amount of water in blood purification treatments.

The pure water permeability (UFR) is preferably 30 to 500 ml/m²·mmHg·hr. Within this range, the hollow-fiber membrane can efficiently be spun.

The pure water permeability (UFR) can be determined as follows.

Water (37° C.) is flowed through a module packed with the hollow-fiber membrane at a transmembrane pressure of 100 mmHg for 1 minutes to measure the filtration flow rate (Q). The water permeability (UFR) is calculated from the following equation.

Water permeability $(UFR) = Q$ (ml/min)×60 (min/hr)/($A$ (m²)×100 (mmHg))

where Q is a filtration flow rate (min/min), and A is an effective membrane area (m²).

The sieving coefficient of the membrane of the invention to albumin is not less than 0.01. When the sieving coefficient exceeds 0.01, albumin loss by blood purification treatment is too much.

The sieving coefficient of albumin is determined using an albumin solution (5% by weight in saline, pH 7.2).

The membrane of the invention has a substantially homogeneous interior structure. When the membrane has a heterogeneous interior structure, the separation with the membrane occurs only in the active layer of the membrane surface. Therefore, when partial defects or fluctuations at the separation on the membrane surface are produced, the membrane is readily plugged around that parts. In particular, in the case of filtration of blood, containing a large amount of hemocytes and proteins, these components have very significant effects on the plugging or fouling. On the contrary, the homogeneous membrane supports the filtration with the entire membrane and therefore, even when part of the membrane surface has the above defects, the entire membrane can make up for the defects and the above fouling can be inhibited. That is, when the membrane has a homogeneous structure, the filtration can be supported by the entire interior structure of the membrane, and stable dialysis filtration properties can be obtained.

The substantially homogeneous interior structure of the membrane means that the hollow-fiber membrane has no asymmetry about the radial direction and cross section, and the hollow-fiber membrane has not only a symmetry about the radial direction, but also a homogeneous porous structure substantially in the wall of the membrane. In other words, the substantially homogeneous interior structure means that observation of the water-washed and freeze-dried membrane of the invention with a microscope reveals a homogeneous sectional structure of the membrane without a finger-like or stitch structure, etc.

When the membrane has a heterogeneous structure, for example, when the membrane is composed of hydrophobic and hydrophilic polymers, the hydrophilic polymer in the membrane effuses from large pores of the membrane. This effusion sometimes causes problems such as changes in membrane performances and a large amount of effusions from the membrane. However, when the membrane has a homogeneous structure, the hydrophilic polymer in the membrane is confined in the membrane structure and thus tightly fixed, and the above problems are not caused. In addition, when the heterogeneous membrane has large pores on the outer surface of the membrane, there is a fear of problems such as the contamination of foreign substances such as endotoxin from the dialyzate side. However, there is no such fear in the case of homogeneous membranes.

The surface of the membrane of the invention has a smooth structure. The smoothness of the surface in contact with blood is especially important for preventing the fouling with proteins, etc. in hemofiltration and obtaining stably high filtration properties.

When the membrane surface has an uneven structure, observation even with an atomic microscope is substantially difficult. Thus, observation with an SEM is a practical method for the evaluation of the membrane.

Accordingly, the smooth surface structure of the membrane means that, after the membrane is washed with water, freeze-dried to maintain the membrane structure and then observed with a 5000-power electron microscope, no pores or unevenness are clearly recognized.

The observation with a 5000-power SEM revealing no clearly recognizable pores or unevenness means that there are substantially no pores having a diameter of not less than 0.2 mm on a magnified photograph (×5000), i.e., substantially no pores having a diameter of not less than 400 angstroms on the inner surface. The observation with a 5000-power SEM revealing no clearly recognizable pores or unevenness means that there is substantially no unevenness with a size of 1 mm on a magnified photograph (×5000), i.e., substantially no unevenness with a size of not less than 0.2 μm on the inner surface of the membrane.

When bovine blood containing an anticoagulant is flowed at a flow rate of 200 ml/min through the inside or outside of hollow-fiber membrane packed in a module in a packing ratio of 55% and a membrane area of 1.5 m² to carry out hemofiltratin, there is substantially no differential between ultrafiltration rates (ml/min·mmHg) per module of the inside and outside of the membrane. This fact demonstrates the homogeneity of the membrane described above.

Because the membrane of the invention has also a smooth membrane surface on the dialyzate side in blood purification treatments, the contamination from the dialyzate side can be inhibited, and the uremic toxins can smoothly be transferred to the dialyzate.

When bovine blood having a hematocrit value of 30% and a protein concentration of 7 g/dl is flowed at a flow rate of 200 ml/min to carry out hemofiltration, the retention of the sieving coefficient of $\beta$2-MG (molecular weight: 11,600) at a filtration flow rate of 50 ml/min to the sieving coefficient of $\beta$2-MG at a filtration flow rate of 10 ml/min is not less than 60%. When the retention is less than 60%, therapies, in which a large amount of water is removed, insufficiently remove uremic toxins having thousands to scores of thousands of molecular weights such as $\beta$2-MG, and provides insufficient therapeutic effects.

The above retention is preferably not less than 65%.

The protein concentration and hematocrit value of bovine blood in the invention have significant effects on the ultrafiltration rate (UFR). In the present invention, the protein concentration and hematocrit value are defined based on the reported hematocrit value (25 to 30%) and protein concentration (6 to 7 g/dl) of bovine blood (37° C.) used in the method for evaluating membrane performances compiled by the High-Performance Membrane Research Working Group.

When bovine blood having a hematocrit value of 30% and a protein concentration of 7 g/dl is flowed at a flow rate of 200 ml/min through a module packed with the membrane of the invention to carry out hemofiltration, the sieving coefficient of $\beta$2-MG at a filtration flow rate of 10 ml/min is preferably not less than 0.5. When the sieving coefficient of $\beta$2-MG is less than 0.5, HF or HDF treatment can inefficiently remove uremigenic substances having thousands to scores of thousands of molecular weights such as $\beta$2-MG and provide insufficient therapeutic effects.

The sieving coefficient of $\beta$2-MG is preferably not less than 0.55.

When bovine blood having a hematocrit value of 30% and a protein concentration of 7 g/dl is flowed at a flow rate of 200 ml/min through a module packed with the membrane of the invention to carry out hemofiltration at a filtration flow rate of 50 ml/min, the retention of the ultrafiltration rate (UFR) 5 hours after the beginning of the hemofiltration to the ultrafiltration flow rate 10 minutes after the beginning of the hemofiltration is not less than 80%. When this retention is less than 80%, the fouling of the membrane greatly decreases the filtration efficiency, and lowers the removing performance.

When bovine blood having a hematocrit value of 30% and a protein concentration of 7 g/dl is flowed through a module packed with the membrane of the invention at a flow rate of 200 ml/min and a transmembrane pressure of 300 mmHg, the filtration flow rate per module is not less than 70 ml/min. When the filtration flow rate per module is less than 70 ml/min, HF or HDE treatment can inefficiently and insufficiently remove uremigenic substances having thousands to scores of thousands of molecular weights such as $\beta$2-MG. In this case, increasing the filtration flow rate by force raises the transmembrane pressure, it fears, that causes hemolysis.

The ultrafiltration flow rate per module is preferably not less than 80 ml/min, more preferably not less than 85 ml/min.

The materials for the membrane of the invention are not specifically limited. Examples thereof include cellulose polymers, polysulfone polymers, polyamide polymers, etc. In view of the aptitude for artificial kidney membranes, cellulose polymers and polysulfone polymers are preferred. Preferred examples of the cellulose polymers include cellulose acetate, cellulose triacetate, and cellulose. Preferred examples of the polysulfone polymers include polysulfone, polyether sulfone, and polyaryl sulfone. In particular, cellulose triacetate polymers and polyether sulfone are preferred because they have good balance between the hydrophilicity and hydrophobicity of the polymers and low absorbability of proteins.

The polymerization degree of the polymer is related to the smoothness of the membrane surface obtained. Cellulose triacetate polymers having a mean polymerization degree of not less than 300 provide preferred smoothness of the membrane surface. Polyether sulfones having a reduced viscosity (a substitute variable for a polymerization degree) of not less than 0.6 provide preferred smoothness of the membrane surface.

When a polyether sulfone having high hydrophobicity is used as a polymer, a hydrophilic polymer such as polyvinylpyrrolidone or polyethylene glycol is preferably formulated to increase the hydrophilicity of the entire membrane.

The process for producing the membrane of the invention is not specifically limited. The membrane can be obtained by conventional methods. For example, a polymer dope can be extruded onto a support to form a flat membrane. Alternatively, a polymer dope can be extruded from a tube-in-orifice spinneret (including a double-tubular or double-annular spinneret) to form a hollow-fiber membrane.

The hollow-fiber membrane of the invention is preferably prepared by the air-gap spinning method using gas as a bore-forming agent to form small pores with homogeneous size on the inner surface and to obtain smooth surface conditions. Examples of the gas used include nitrogen, helium, air, etc. In view of stable quality and supply, nitrogen is preferred. The temperature of the gas as a bore-forming agent is preferably at least 20° C. higher than the temperature of the coagulable liquid to improve the smoothness of the membrane surface, and water-permeability, separability in hemodialysis filtration, etc. and their retention.

Preferably, the hollow fibers are spun with substantially no stretching, i.e., the hollow fibers are drawn without any compulsory stretching but only with the force necessary for drawing the spinning process, to inhibit deformation of the pores formed on the membrane. The term "with substantially no stretching" means that stretching is not more than 10% in each step of the spinning.

The hollow-fiber membrane of the invention can be produced, for example, as follows. However, the following process is not to be construed to limit the scope of the invention.

The spinning dopes includes combinations of one or more polymers, combinations of one or more solvents, and combinations of one or more nonsolvents.

In the spinning dope, the fraction of the total polymer is suitably 15 to 35% by weight. When it is less than 15%, the low viscosity of the spinning dope deteriorates spinnable properties. When it exceeds 35%, the phase separation occurs too fast. The fraction of the total solvent is preferably 30 to 70% by weight, and the fraction of the total nonsolvent is preferably 5 to 50% by weight.

After the above spinning dope is heated to room temperature to 190° C. to obtain a homogeneous solution, the solution is subjected to deaeration and filtration, and extruded from the outer orifice of a tube-in-orifice spinneret, and a dried gas heated to 50° to 160° C. is supplied into the center (i.e., inner tube) at a constant rate. The extruded spinning dope is passed through the air in a distance of 1 to 20 mm, introduced to a coagulable liquid (5° to 60° C.) bath to coagulate the dope to form a membrane structure. The coagulated product is washed with water, passed through an aqueous solution of glycerin (30 to 60% by weight) to maintain the membrane structure, impregnated with glycerin, dried with a dryer, and rolled.

The above solvents include so-called aprotic polar solvents such as N,N-dimethylformamide, N,N-dimethylacetamide, γ-butyrolactone, N-methylpyrrolidone, etc. These solvents can be used alone or in combination thereof. The nonsolvents include inorganic salts, alcohols, etc. It is preferred to use glycols such as glycerin, ethylene glycol, triethylene glycol, polyethylene glycol, etc. alone or in combination. In particular, the nonsolvent is important for controlling the phase separation conditions. For example, it is preferred to control the phase separation conditions in the presence of glycerin. Secondary polymers such as polyvinylpyrrolidone, etc. may be added to the spinning dope.

The above coagulable liquids include water, and aqueous solutions containing water, a solvent and nonsolvent used as the spinning dope.

The performances of the hollow-fiber membrane can be controlled by so-called phase separation conditions such as the composition and temperature of the spinning dope, the composition and temperature of the coagulable liquid, and the concentration of glycerin for impregnation, etc.

In order to obtain a hollow-fiber membrane having a homogeneous structure and smooth membrane surface, it is necessary to use a non-coagulable gas as a bore-forming agent, i.e., carry out spinning substantially in the absence of any inner liquids, in the step for the formation of the hollow-fiber membrane. The spinning is preferably carried out by the air-gap spinning method. The drawing distance in the air (i.e., a distance from the orifice to the surface of the coagulable liquid) is preferably short, for example, 1 to 20 mm. When the drawing distance in the air is zero, the membrane surface is rapidly coagulated to form wrinkles, which decreases the smoothness of the membrane surface. When the flowing distance in the air exceeds 20 mm, the hollow fibers readily break, and the pores on the inner surface of the membrane tends to be small and asymmetrical.

After the extrusion of the dope, it is necessary to carry out the spinning step with substantially no stretching i.e., with stretching of not more than 10%, in each bath (e.g., coagulation bath, water-cooling bath, glycerin bath, etc.).

The polymerization degree of the polymer is preferably high sufficient for spinning in the absence of any inner liquids. The polymerization degree of the polymer varies with the materials used. The polymers with a low polymerization degree cause some problems. For example, the resulting membrane has partial micropores on the membrane surface, and it is difficult to form a homogeneous and smooth membrane surface.

The sieving coefficient (hereinafter referred to as SC) and ultrafiltration rate in blood (hereinafter referred to as UFR (B)) of the membrane of the invention can be determined as follows.

Five thousand to twenty thousand hollow-fiber membranes or 50 to 300 flat membranes of invention are packed in a plastic molding to make a module. After this module is washed with physiological saline, bovine blood described above is flowed at 200 ml/min on the blood side. The pressures at the inlet and outlet on the blood side and the pressure on the dialysate side of the module are controlled so that the filtration flow rate per 1.5 m$^2$ of the membrane area of the module is 10 to 50 ml/min. After hemofiltration, the following items are determined.

1. SC of β2-MG

The blood and filtrate at the inlet and outlet of the module are sampled at 15 minutes after the beginning of hemofiltration at a filtration flow rate of 10 or 50 ml/min to determine the concentration of β2-MG by an enzyme immunoassay (e.g., Glazyme β2-Microglobulin—EIA Test, Wako Pure Chemical Industries, Ltd.), etc. The bovine blood used for the assay contains an appropriate amount of human-derived β2-MG. The sampled blood is centrifuged for the assay for β2-MG.

SC of β2-MG is calculated from these concentrations of β2-MG according to Formula 1 below.

$$SC = Cfil/((Cl+Co)/2) \qquad \text{(Formula 1)}$$

where Cfil is a concentration of β2-MG in the filtrate, Cl is a concentration of β2-MG at the inlet on the blood side of the module, and Co is a concentration of β2-MG in the plasma at the outlet on the blood side of the module.

2. The retention ratio of UFR (B)

The pressures at the inlet and outlet on the blood side and on the filtrate side were measured 15 minutes and 5 hours after the beginning of hemofiltration at a filtration flow rate of 50 ml/min.

Figure 2:
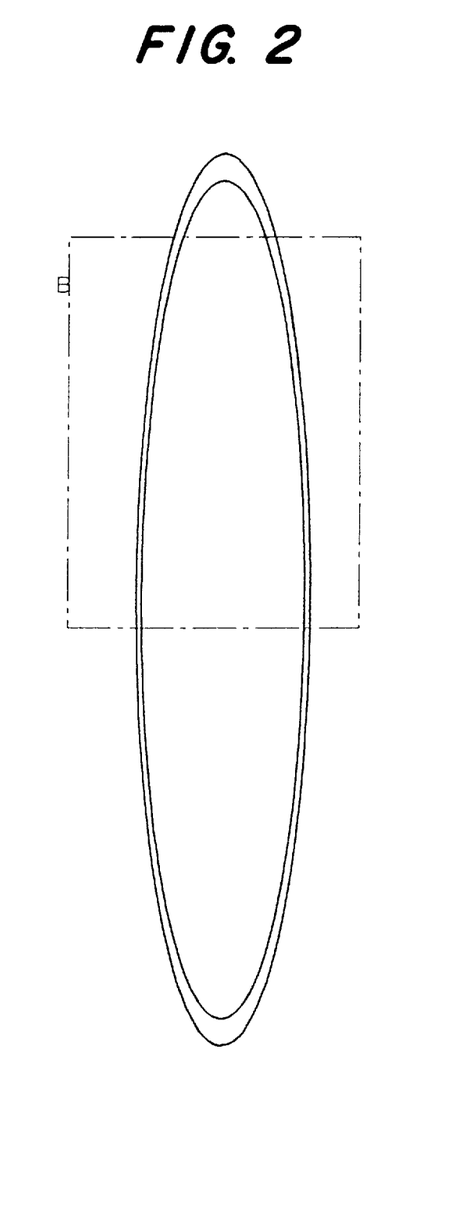
FIG. 2 is a diagram of an oblique sectional view along the line 2—2 of the hollow-fiber membrane in FIG. 1.

UFR (B) is calculated from these values according to Formula 2 below, and the retention of UFR (B) at 5 hours after the beginning of hemofiltration to UFR (B) at 15 minutes after the beginning of hemofiltration (i.e., the retention ratio of UFR (B)) is calculated.

$$UFR\ (B) = Qf/(Ax((Pl+Po)/2-Pfil)) \qquad \text{(FIG. 2)}$$

where Qf is an ultrafiltration flow rate (ml/hour), A is an effective surface area of the membrane (m$^2$), Pl is a pressure at the inlet on the blood side of the module (mmHg), Po is a pressure at the outlet on the blood side of the module (mmHg), and Pfil is a pressure on the filtrate side of the module (mmHg).

3. The sieving coefficient of albumin

Albumin is dissolved to a concentration of 5% by weight in physiological saline to which a phosphate buffer has been added, and the solution is adjusted to pH 7.2. The albumin solution is flowed through the above module at a flow rate of 200 ml/min. The albumin concentrations at the inlet and outlet and filtrate of the module are determined by the BCG method at a filtration flow rate of 10 ml/min per 1.5 m$^2$.

The sieving coefficient of albumin is calculated from the albumin concentrations according to Formula 3 below.

$$SC = Dfil/((Dl+Do)/2) \qquad \text{(Formula 3)}$$

where Dfil is an albumin concentration in the filtrate, Dl is an albumin concentration at the inlet of the module, and Do is an albumin concentration at the outlet of the module.

The following examples further illustrates the present invention in detail but are not to be construed to limit the scope thereof.

EXAMPLE 1

The raw material composed of cellulose triacetate (19% by weight) having a mean polymerization degree of about 360 (Cellulose Triacetate LT 105 of Daicel Chemical Industries, Ltd.), the solvent N-methyl-2-pyrrolidone (57% by weight) and the nonsolvent ethylene glycol (24% by weight) was heated to 180° C. to obtain a dope solution. The dope solution was extruded from the outer orifice of the tube-in-orifice spinneret, and nitrogen heated to 140° C. was introduced into the center of the spinneret to obtain a hollow-fiber material. The hollow-fiber material was passed through the air in a distance of 4 mm, and then introduced to a coagulable liquid (20° C.) bath (a mixture of water, N-methyl-2-pyrrolidone and ethylene glycol (=63:26:11 by weight)) to complete the coagulation. Then, the coagulated materials were washed with water, impregnated with a glycerin solution (50% by weight), and dried with a dryer to obtain a hollow-fiber membrane having an inner diameter of 195 μm, a membrane thickness of 20 μm and a porosity of 80%.

Figure 1:
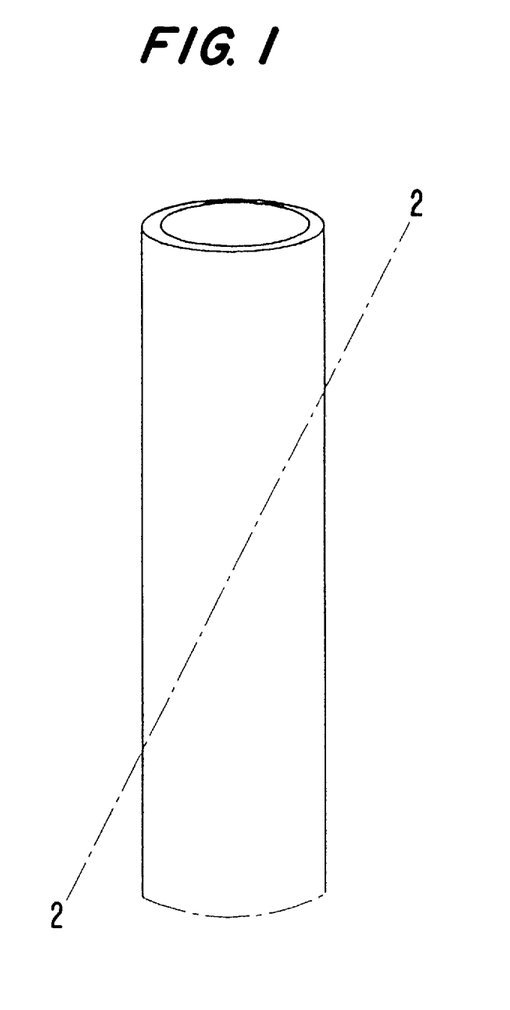
FIG. 1 is a diagram of an oblique view of the hollow-fiber blood purification membrane.
Figure 3:
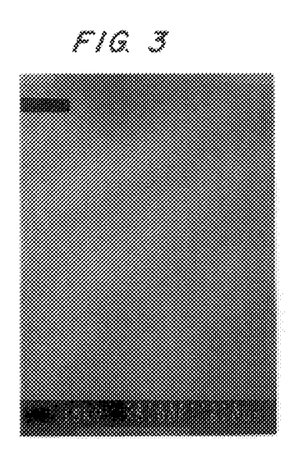
FIG. 3 is a 5000-power scanning electron microscope photograph of the inner surface of the hollow-fiber membrane obtained in Example 1.
Figure 4:
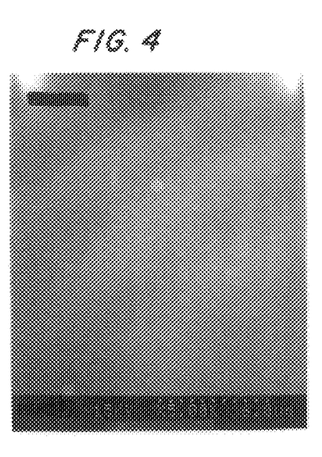
FIG. 4 is a 5000-power scanning electron microscope photograph of the outer surface of the hollow-fiber membrane obtained in Example 1.
Figure 5:
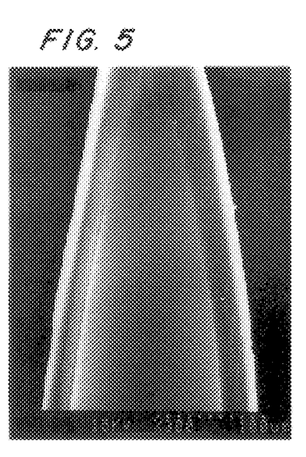
FIG. 5 is a 300-power scanning electron microscope photograph of a part of the oblique sectional view of the hollow-fiber membrane obtained in Example 1.

The inner and outer surfaces of the hollow-fiber membrane were observed with a scanning electron microscope (hereinafter referred to as SEM). As shown in FIGS. 3 and 4, the inner and outer surfaces had a smooth structure with no recognizable pores or unevenness even at a magnification of 5000. A part (the interior of B line in FIG. 2) of the cross section (FIG. 2) of the hollow-fiber membrane along the line 2—2 shown in FIG. 1 was observed at a magnification of 300. As shown in FIG. 5, it was confirmed that the interior of the membrane has a homogeneous structure.

8400 hollow-fiber membranes were packed in a plastic molding, and both ends were hardened and fixed with an urethane adhesive to obtain a module.

Blood (37° C., hematocrit value: 28%, protein concentration: 7 g/dl) was introduced into the module thus obtained at a flow rate of 200 ml/min to evaluate the performances of the hollow-fiber membrane. The results are shown in Table 1.

EXAMPLE 2

The raw material composed of polyether sulfone (20% by weight) (a reduced viscosity in a dimethylformamide solution (1% by weight) thereof being 0.62), polyvinylpyrrolidone (K-90)(5% by weight), the solvent N-methyl-2-pyrrolidone (37.5% by weight) and the nonsolvent polyethylene glycol #200 (37.5% by weight) was heated to 110° C. to obtain a dope solution. The dope solution was extruded from the outer orifice of the tube-in-orifice spinneret, and nitrogen heated to 80° C. was introduced into the center of the spinneret to obtain a hollow-fiber material. The hollow-fiber material was passed through the air in a distance of 7 mm, and then introduced to a coagulable liquid bath (15° C.) (a mixture of water, N-methyl-2-pyrrolidone and polyethylene glycol #200 (=70:15:15 by weight)) to complete the coagulation. Then, the coagulated material was washed with water, impregnated with a glycerin solution (50% by weight), and dried with a dryer to obtain a hollow-fiber membrane having an inner diameter of 201 μm, a membrane thickness of 21 μm and a porosity of 78%.

As in Example 1, observation of the hollow-fiber membrane with an SEM confirmed that the membrane thus obtained has a smooth structure of the inner and outer surfaces with no recognizable pores or unevenness even at a magnification of 5000, and that the interior of the membrane has a homogeneous structure.

The properties of the hollow-fiber membrane of the module obtained were evaluated in the same manner as that described in Example 1. The results are shown in Table 1.

EXAMPLE 3

The raw material composed of polyether sulfone (27% by weight) (a reduced viscosity in a dimethylformamide solution (1% by weight) thereof being 0.7), polyvinylpyrrolidone (K-90)(3% by weight), the solvent N-methyl-2-pyrrolidone (42% by weight) and the nonsolvent polyethylene glycol #200 (28% by weight) was heated to 140° C. to obtain a dope solution. The dope solution was extruded from the outer orifice of the tube-in-orifice spinneret, and nitrogen heated to 120° C. was introduced into the center of the spinneret to obtain a hollow-fiber material. The hollow-fiber material was passed through the air in a distance of 3 mm, and then introduced to a coagulable liquid (30° C.) bath (a mixture of water, N-methyl-2-pyrrolidone and polyethylene glycol #200 (=70:18:12 by weight)) to complete the coagulation. Then, the coagulated material was washed with water, impregnated with a glycerin solution (50% by weight), and dried with a dryer to obtain hollow-fiber material having an inner diameter of 200 μm, a membrane thickness of 30 μm and a porosity of 68%.

As in Example 1, observation of the hollow-fiber membrane with SEM confirmed that the inner and outer surfaces have a smooth structure with no recognizable pores or unevenness even at a magnification of 5000, and that the interior of the membrane has a homogeneous structure.

The performance of the hollow-fiber membrane of the module obtained was evaluated in the same manner as that described in Example 1. The results are shown in Table 1.

Blood (37° C., hematocrit value: 28%, protein concentration: 7 g/dl) is introduced into the inner or outer sides of the hollow-fiber membrane at a flow rate of 200 ml/min to carry out hemofiltration. The ultrafiltration rate (ml/min·mmHg) per module was 25 ml/min·mmHg when the blood was flowed in the inner side, and 23 ml/min·mmHg when the blood was flowed in the outer side. There was substantially no difference between the two ultrafiltration rates. This result suggests that the membrane has a homogeneous structure.

EXAMPLE 4

The raw material composed of cellulose triacetate (17% by weight) having a mean polymerization degree of about 360 (Cellulose Triacetate LT 105 of Daicel Chemical Industries, Ltd.), the solvent N-methyl-2-pyrrolidone (58% by weight), the nonsolvent ethylene glycol (12.5% by weight) and glycerin (12.5% by weight) was heated to 180° C. to obtain a dope solution. The solution was extruded at 144° C. from the outer orifice of the tube-in-orifice spinneret, and nitrogen heated to 130° C. was introduced into the center of the spinneret to obtain a hollow-fiber material. The hollow-fiber material was passed through the air in a distance of 4 mm, and then introduced to a coagulable liquid (25° C.) bath (a mixture of water, N-methyl-2-pyrrolidone, ethylene glycol and glycerin (=61:27:6:6 by weight)) to complete the coagulation. Then, the coagulated material was washed with water, impregnated with a glycerin solution (60% by weight), and dried with a dryer to obtain hollow-fiber membrane having an inner diameter of 202 μm, a membrane thickness of 25.6 μm and a porosity of 67%.

As in Example 1, observation of the hollow-fiber membrane with SEM confirmed that the inner and outer surfaces have a smooth structure with no recognizable pores or unevenness even at a magnification of 5000, and that the interior of the membrane has a homogeneous structure.

The performances of the hollow-fiber membrane of the module obtained were evaluated in the same manner as that described in Example 1. The results are shown in Table 1.

EXAMPLE 5

The raw material composed of polyether sulfone (25% by weight) (a reduced viscosity in a dimethylformamide solution (1% by weight) thereof being 0.7), polyvinylpyrrolidone (K-90)(3% by weight), the solvent N-methyl-2-pyrrolidone (50% by weight), the nonsolvent triethylene glycol (15% by weight) and glycerin (7% by weight) was heated to 150° C. to obtain a dope solution. The dope solution was extruded from the outer orifice of the tube-in-orifice spinneret, and nitrogen heated to 100° C. was introduced into the center of the spinneret to obtain a hollow-fiber material. The hollow-fiber material was passed through the air in a distance of 4 mm, and then introduced to a coagulable liquid (30° C.) bath (a mixture of water, N-methyl-2-pyrrolidone, triethylene glycol and glycerin (=70:21:6:3 by weight)) to complete the coagulation. Then, the coagulated material was washed with water, impregnated with a glycerin solution (50% by weight), and dried with a dryer to obtain a hollow-fiber membrane having an inner diameter of 198 $\mu$m, a membrane thickness of 28 $\mu$m and a porosity of 63%.

As in Example 1, observation of the hollow-fiber membrane with SEM confirmed that the inner and outer surfaces have a smooth structure with no recognizable pores or unevenness even at a magnification of 5000, and that the interior of the membrane has a homogeneous structure.

The performances of the hollow-fiber membrane of the module obtained were evaluated in the same manner as that described in Example 1. The results are shown in Table 1.

COMPARATIVE EXAMPLE 1

The raw material composed of polyether sulfone (23% by weight) (a reduced viscosity in a dimethylformamide solution (1% by weight) thereof being 0.52), the solvent N-methyl-2-pyrrolidone (38.5% by weight) and the nonsolvent polyethylene glycol #200 (38.5% by weight) was heated to 130° C. to obtain a dope solution. The dope solution was extruded from the outer orifice of the tube-in-orifice spinneret, and nitrogen heated to 70° C. was introduced into the center of the spinneret to obtain a hollow-fiber material. The hollow-fiber material was passed through the air in a distance of 2 mm, and then introduced to a coagulable liquid (30° C.) bath (a mixture of water, N-methyl-2-pyrrolidone, polyethylene glycol #200 (=70:15:15 by weight)) to complete the coagulation. Then, the coagulated material was washed with water, impregnated with a glycerin solution (50% by weight), and dried with a dryer to obtain hollow-fiber membrane having an inner diameter of 202 $\mu$m, a membrane thickness of 43 $\mu$m and a porosity of 65%.

Figure 6:
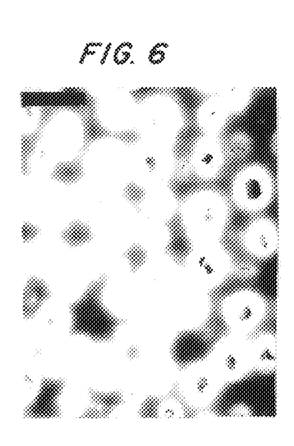
FIG. 6 is a 5000-power scanning electron microscope photograph of the inner surface of the hollow-fiber membrane obtained in Comparative Example 1.
Figure 7:
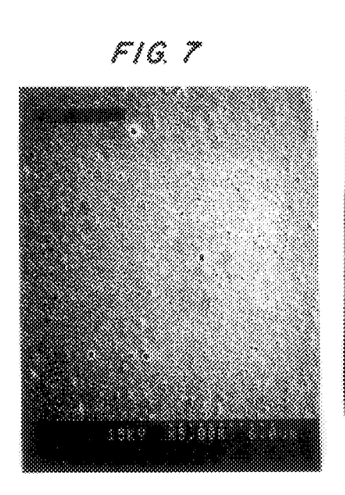
FIG. 7 is a 5000-power scanning electron microscope photograph of the outer surface of the hollow-fiber membrane obtained in Comparative Example 1.
Figure 8:
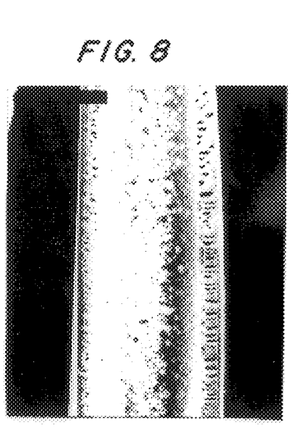
FIG. 8 is a 150-power scanning electron microscope photograph of a part of the oblique sectional view of the hollow-fiber membrane obtained in Comparative Example 1.

Observation of the inner surface of the hollow-fiber membrane with a 5000-power SEM revealed large pores in the submicron region as shown in FIG. 6. Observation of the outer surface of the hollow-fiber membrane with a 5000-power SEM revealed pores and unevenness as shown in FIG. 7. Observation of a part (the interior of B line in FIG. 2) of the cross section (FIG. 2) of the hollow-fiber membrane along the line 2—2 shown in FIG. 1 at a magnification of 150 confirmed that the interior of the membrane has a finger-like structure as shown in FIG. 8.

The performances of the hollow-fiber membrane of the module obtained were evaluated in the same manner as that described in Example 1. The results are shown in Table 2.

COMPARATIVE EXAMPLE 2

The raw material composed of polyether sulfone (23% by weight) (a reduced viscosity in a dimethylformamide solution (1% by weight) thereof being 0.52), the solvent N-methyl-2-pyrrolidone (38.5% by weight) and the nonsolvent polyethylene glycol #200 (38.5% by weight) was heated to 130° C. to obtain a dope solution. The dope solution was extruded from the outer orifice of the tube-in-orifice spinneret, and nitrogen heated to 40° C. was introduced into the center of the spinneret to obtain a hollow-fiber material. The hollow-fiber material was passed through the air in a distance of 2 mm, and then introduced to a coagulable liquid (30° C.) bath (a mixture of water, N-methyl-2-pyrrolidone and polyethylene glycol #200 (=70:15:15 by weight)) to complete the coagulation. Then, the coagulated material was washed with water, impregnated with a glycerin solution (50% by weight), and dried with a dryer to obtain a hollow-fiber membrane having an inner diameter of 199 $\mu$m, a membrane thickness of 33 $\mu$m and a porosity of 73%.

Figure 9:
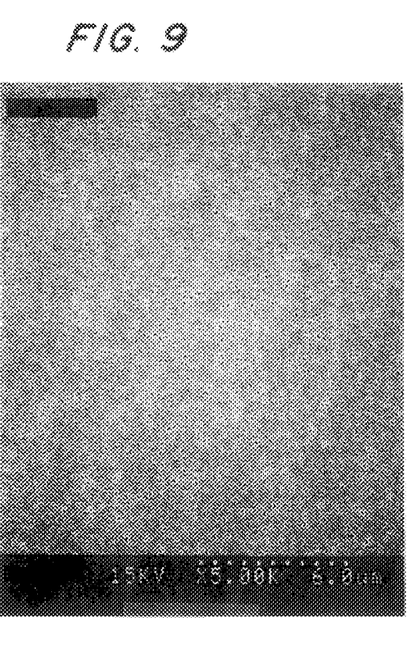
FIG. 9 is a 5000-power scanning electron microscope photograph of the inner surface of the hollow-fiber membrane obtained in Comparative Example 2.
Figure 10:
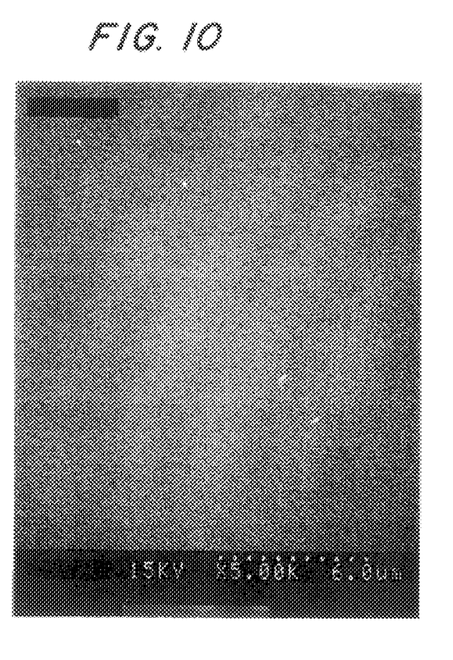
FIG. 10 is a 5000-power scanning electron microscope photograph of the outer surface of the hollow-fiber membrane obtained in Comparative Example 2.
Figure 11:
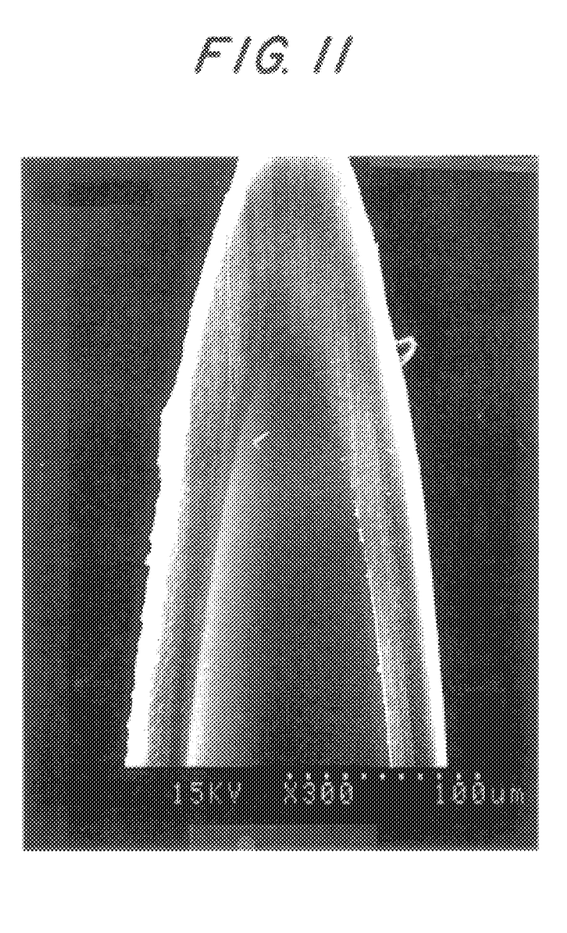
FIG. 11 is a 300-power scanning electron microscope photograph of a part of the oblique sectional view of the hollow-fiber membrane obtained in Comparative Example 2.

As in Comparative Example 1, observation of the hollow-fiber membrane with SEM confirmed that the inner and outer surfaces have pores and/or unevenness even at a magnification of 5000, although the interior of the membrane had a nearly homogeneous structure (FIGS. 9–11).

The properties of the hollow-fiber membrane of the module obtained were evaluated in the same manner as that described in Example 1. The results are shown in Table 2.

COMPARATIVE EXAMPLE 3

The raw material composed of cellulose triacetate (24% by weight) having a mean polymerization degree of about 330 (Cellulose Triacetate LT 85 of Daicel Chemical Industries, Ltd.), the solvent N-methyl-2-pyrrolidone (53% by weight) and the nonsolvent ethylene glycol (23% by weight) was heated to 180° C. to obtain a dope solution. The dope solution was extruded from the outer orifice of the tube-in-orifice spinneret, and liquid paraffin was introduced into the center of the spinneret to obtain a hollow-fiber material. The hollow-fiber material was passed through the air in a distance of 40 mm, and then introduced to a coagulable liquid bath (20° C.) (a mixture of water, N-methyl-2-pyrrolidone and ethylene glycol (=60:28:12 by weight)) to complete the coagulation. Then, the coagulated material was washed with water, impregnated with a glycerin solution (50% by weight), and dried with a dryer to obtain a hollow-fiber membrane having an inner diameter of 195 $\mu$m, a membrane thickness of 15 $\mu$m and a porosity of 79%.

The performances of the hollow-fiber membrane of the module obtained were evaluated in the same manner as that described in Example 1. The results are shown in Table 2.

COMPARATIVE EXAMPLE 4

The raw material composed of cellulose triacetate (24% by weight) having a mean polymerization degree of about 330 (Cellulose Triacetate LT 85 of Daicel Chemical Industries, Ltd.), the solvent N-methyl-2-pyrrolidone (53% by weight) and the nonsolvent ethylene glycol (23% by weight) was heated to 180° C. to obtain a dope solution. The dope solution was extruded from the outer orifice of the tube-in-orifice spinneret, and liquid paraffin was introduced into the center of the spinneret to obtain a hollow-fiber material. The hollow-fiber material was passed through the air in a distance of 15 mm, and introduced to a coagulable liquid (25° C.) bath (a mixture of water, N-methyl-2-pyrrolidone and triethylene glycol (=63:26:11 by weight)). Because the spinnability was unstable, the hollow-fiber membrane was stretched (12%) in the coagulable liquid bath to complete the coagulation. Then, the coagulated material was washed with water, impregnated with glycerin (56% by weight), and dried with a dryer to obtain hollow-fiber membrane having an inner diameter of 195 μm, a membrane thickness of 15 μm and a porosity of 79%.

The performances of the hollow-fiber membrane of the module obtained were evaluated in the same manner as that described in Example 1. The results are shown in Table 2.

TABLE 1

|  | Ex. 1 | Ex. 2 | Ex. 3 | Ex. 4 | Ex. 5 |
|---|---|---|---|---|---|
| Membrane thickness (μm) | 20 | 21 | 29 | 26 | 28 |
| Inner diameter (μm) | 195 | 201 | 200 | 202 | 198 |
| Porosity (%) | 83 | 78 | 69 | 67 | 63 |
| S Calb | <0.01 | <0.01 | <0.01 | <0.01 | <0.01 |
| UFR water (ml/m² · Hr · mmHg) | 250 | 50 | 145 | 183 | 195 |
| Membrane structure | Homo-geneous, Smooth | Homo-geneous, Smooth | Homo-geneous, Smooth | Homo-geneous, Smooth | Homo-geneous, Smooth |
| SC β2-MG |  |  |  |  |  |
| Qf10 | 0.59 | 0.75 | 0.87 | 0.88 | 0.85 |
| Qf50 | 0.57 | 0.64 | 0.75 | 0.72 | 0.68 |
| Retention ratio (%) | 97 | 85 | 86 | 82 | 80 |
| UFR blood |  |  |  |  |  |
| 15 min ml/m² hr mmHg | 20.5 | 19.5 | 16.5 | 25 | 23.5 |
| 5 hr | 19.2 | 18.4 | 13.5 | 22.7 | 19.5 |
| Retention ratio (%) | 94 | 94 | 82 | 91 | 83 |
| Qf (TMP 300 mmHg) ml/min | 70 | 71 | 71 | 92 | 86 |

TABLE 2

|  | Comp. Ex. 1 | Comp. Ex. 2 | Comp. Ex. 3 | Comp. Ex. 4 |
|---|---|---|---|---|
| Membrane thickness (μm) | 43 | 33 | 15 | 25 |
| Inner diameter (μm) | 202 | 199 | 197 | 200 |
| Porosity (%) | 65 | 73 | 79 | 68 |
| S Calb | 0.023 | 0.012 | <0.01 | <0.01 |
| UFR water (ml/m² · Hr · mmHg) | 100 | 150 | 100 | 165 |
| Membrane structure | Micropores, Uneven, Finger-like | Micropores, Uneven, Nearly homo-geneous | Nearly homo-geneous | Nearly homo-geneous |
| SC β2-MG |  |  |  |  |
| Qf10 | 0.71 | 0.68 | 0.65 | 0.88 |
| Qf50 | 0.48 | 0.33 | 0.29 | 0.44 |
| Retention ratio (%) | 68 | 49 | 45 | 50 |
| UFR blood |  |  |  |  |
| 15 min ml/m² hr mmHg | 18.5 | 17.5 | 15.1 | 17.4 |
| 5 hr | 10.3 | 12.5 | 10.9 | 12.9 |
| Retention ratio (%) | 56 | 71 | 72 | 74 |
| Qf (TMP 300 mmHg) ml/min | 41 | 45 | 46 | 62 |

As described above, the present invention provides a blood purification membrane suitable for therapies in which a large amount of water is removed (e.g., hemodiafiltration and hemofiltration), as well as for conventional hemodialysis. The present invention also provides a process for producing the blood purification membrane, and a module for blood purification packed with the blood purification membrane.

The module of the invention can maintain stable removal of a large amount of water in therapies in which a large amount of water is removed. In addition, the module can efficiently remove uremigenic substances such as β2-MG as well as a large amount of water by dialysis or filtration.

Thus, the module of the invention can stably be used for the therapy for chronic renal failure, etc. in the case of the removal of a large amount of water.

What is claimed is:

1. A blood purification membrane having a membrane thickness of 10 to 35 μm, an inner diameter of 100 to 300 μm, a porosity of 50 to 85%, a water permeability (ultrafiltration rate) at 37° C. of not less than 20 ml/m²·Hr·mmHg and a sieving coefficient of albumin of not more than 0.01, a substantially homogeneous interior structure, and a smooth surface structure.

2. The membrane according to claim 1 having a sieving coefficient retention of not less than 60%, said sieving coefficient retention being a ratio of a sieving coefficient of β2-microglobulin in hemofiltration at a filtration flow rate of 50 ml/min to a sieving coefficient of β2-microglobulin in hemofiltration at a filtration flow rate of 10 ml/min when the hemof iltration is carried out by flowing bovine blood having a hematocrit value of 30% and a protein concentration of 7 g/dl through a module packed with the membrane at a flow rate of 200 ml/min.

3. The membrane of claim 1 having a ultrafiltration rate retention of not less than 80%, said ultrafiltration rate retention being a ratio of an ultrafiltration rate 5 hours after the beginning of hemofiltration to an ultrafiltration rate 15 minutes after the beginning of hemofiltration when the hemofiltration is carried out at a filtration rate of 50 ml/min by flowing bovine blood having a hematocrit value of 30% and a protein concentration of 7 g/dl through a module packed with the membrane at a flow rate of 200 ml/min.

4. The membrane according to claim 1 having a filtration flow rate per module of not less than 70 ml/min when hemofiltration is carried out at a transmembrane pressure of 300 mmHg by flowing bovine blood having a hematocrit value of 30% and a protein concentration of 7 g/dl through a module packed with the membrane at a flow rate of 200 ml/min.

5. The membrane according to claim 1, main materials of which are composed of one or more polymers selected from polysulfone polymers and cellulose polymers.

6. The membrane according to claim 1, which is a hollow-fiber membrane.

7. A process for producing a hollow-fiber membrane as claimed in claim 6 by air-gap spinning, which comprises extruding a spinning dope from a tube-in-orifice spinneret, introducing a gas as a boreforming agent into the center of the spinneret, passing the extruded spinning dope through the air, and coagulating the dope through a coagulable liquid, the temperature of said gas being at least 20° C. higher than the temperature of the coagulable liquid.

8. The process according to claim 7, wherein spinning is carried out with substantially no stretching.

9. The process according to claim 7, wherein glycerin is added to the spinning dope as a nonsolvent.

10. A membrane having a membrane thickness of 10 to 35 μm, an inner diameter of 100 to 300 μm, a porosity of 50 to 85%, a water permeability (ultrafiltration rate) at 37° C. of not less than 20 ml/m$^2$·Hr·mmHg, a sieving coefficient of albumin of not more than 0.01, a substantially homogenous interior structure, a smooth surface structure, and an ultrafiltration rate retention of not less than 80%, said ultrafiltration rate retention being a ratio of a water ultrafiltration rate in hemofiltration at a filtration flow rate of 50 ml/min to a water ultrafiltration rate in hemofiltration at a filtration flow rate of 10 ml/min when the hemofiltration is carried out by flowing bovine blood having a hematocrit value of 30% and a protein concentration of 7 g/dl through a module paced with the membrane at a flow rate of 200 ml/min.

11. A module packed with a blood purification membrane having a membrane thickness of 10 to 35 μm, an inner diameter of 100 to 300 μm, a porosity of 50 to 85%, a water permeability (ultrafiltration rate) at 37° C. of not less than 20 ml/m$^2$·Hr·mmHq and a sieving coefficient of albumin of not more than 0.01, a substantially homogeneous interior structure, and a smooth surface structure, in a packing ratio of 40 to 80% and an effective membrane area of 0.9 to 2.5 m$^2$.

* * * * *